United States Patent Office 3,557,272
Patented Jan. 19, 1971

3,557,272
PROCESS FOR PREPARING POLY-γ-METHYL GLUTAMATE FIBER
Yasuo Takagi and Makoto Iwatsuki, Kawasaki-shi, Kazuhisa Takeshita, Yokohama-shi, and Isao Uemura, Zushi-shi, Japan, assignors to Ajinomoto Co., Inc., Tokyo, Japan
Filed June 24, 1968, Ser. No. 739,517
Claims priority, application Japan, June 24, 1967, 42/40,423
Int. Cl. D01f 7/00
U.S. Cl. 264—184                                   4 Claims

ABSTRACT OF THE DISCLOSURE

Poly-γ-methyl glutamate fiber having non-circular cross-section may be obtained efficiently by a process, which comprises adding carbon tetrachloride, 1,1,1 - trichloroethane, or ethylene tetrachloride to a solution of poly-γ-methyl glutamate in methylene chloride, chloroform, 1,2-dichloroethane, 1,1,2-trichloroethane or tetrachloroethane, and extruding the mixed solution from a circular nozzle into a mixture of an aliphatic hydrocarbon having a boiling point of 80° C. to 400° C. and carbon tetrachloride, 1,1,1-trichloroethane or ethylene tetrachloride.

BRIEF DESCRIPTION OF THE DRAWING

FIG. 1; (a) is a cross-section photograph of poly-γ-methyl glutamate (hereinafter, referred to as PMG) fiber which was obtained by extruding a PMG solution in methylene chloride-ethyl acetate mixture consisting mainly of methylene chloride into an acetone coagulating bath, (b) is a cross-section photograph of PMG fiber which was obtained by extruding a PMG solution in 1,2 - dichloroethane into a methyl ethyl ketone coagulating bath, and (c) is a cross-section photograph of PMG fiber which was obtained by extruding a PMG solution in methylene chloride-dioxane mixture consistingly mainly of methylene chloride into an acetone-methanol mixture coagulating bath.

FIG. 2; (a)–(f) are cross-section photographs of PMG fibers which correspond respectively to samples (a)–(f) in Table 1 of this specification.

FIG. 3; (a)–(g) are cross-section photographs of PMG fibers which correspond respectively to samples (a)–(g) in Table 4 of this specification.

FIG. 4; (a) and (b) are cross-section photographs of PMG fibers which correspond respectively to samples (a) and (b) in Table 5 of this specification.

FIG. 5; (a)–(c) are cross-section photographs of PMG fibers which correspond respectively to samples (a)–(c) in Table 6 of this specification.

FIG. 6; (a)–(i) are cross-section photographs of PMG fibers which correspond respectively to samples (a)–(i) in Table 7 of this specification.

BACKGROUND OF THE INVENTION

The present invention relates to a process for preparing poly-γ-methyl glutamate (hereinafter, referred to as PMG) fiber having non-circular cross-section.

Among all synthetic fibers proposed heretofore, PMG fiber is most similar to natural silk fiber with respect to physical properties, appearance and touch since PMG contains the same peptide linkage as natural silk.

Especially, PMG fiber having non-circular cross-section closely resembles natural silk fiber in its touch compared to PMG fiber having circular cross-section.

Various processes have been proposed heretofore for preparing PMG fiber by wet spinning. For example, (1) Japanese patent publication No. 5,926/1965 discloses a process for preparing PMG fiber by extruding a PMG solution into a coagulating bath containing acetone, ethyl acetate or their mixture, the PMG being dissolved in a methylene chloride-ethyl acetate mixture which consists mainly of methylene chloride. (2) Japanese patent publication No. 27,363/1965 describes a process for preparing PMG fiber, which comprises extruding a PMG solution into a coagulating bath containing acetone (90–60 percent by volume) and methanol (10–40 percent by volume), the PMG being dissolved in a methylene chloride-ethyl acetate mixture or methylene chloride-dioxane mixture, each of which consists mainly of methylene chloride, and (3) there is disclosed in Japanese patent publication No. 6,608/1966 a process for preparing PMG fiber by extruding a PMG solution in halogenated aliphatic hydrocarbon such as methylene chloride, chloroform or 1,2-dichloroethane into a coagulating bath containing acetone, methyl ethyl ketone, lower aliphatic alcohol, diethyl ether, petroleum ether or mixtures of these coagulating liquids.

It has been found that the PMG fibers obtained according to each of the above known processes by using a circular nozzle which is usually applied in wet spinning have approximately circular cross-sections and PMG fabrics made therefrom have a different touch from the characteristic one of natural silk fiber.

Figure 1A:
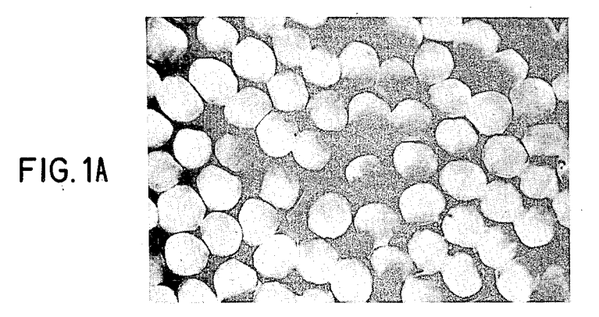
Figure 1B:
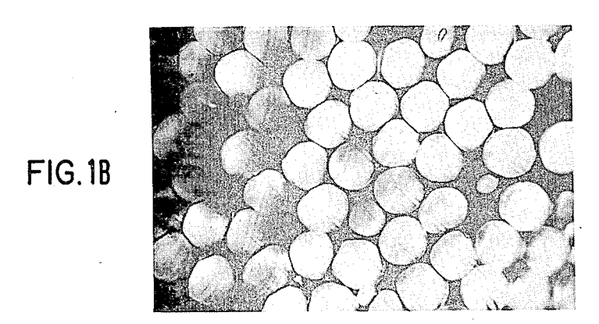
Figure 1C:
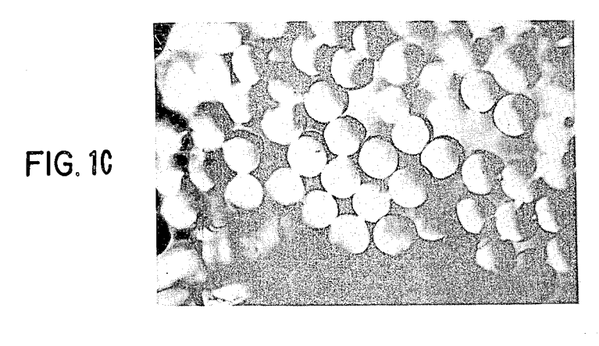

FIG. 1 (a)–(c) are cross-section photographs of wet-spun PMG fibers obtained according to the known processes under the following respective spinning conditions:

(a)

Spinning solvent: Methylene chloride/ethyl acetate mixture=12/5 (by volume)
Polymer concentration: 15 percent by weight
Coagulating agent: Acetone (b)

Spinning solvent: 1,2-dichloroethane
Polymer concentration: 10 percent by weight
Coagulating agent: Methyl ethyl ketone (c)

Spinning solvent: Methylene chloride-dioxane=8/2 (by volume)
Polymer concentration: 7 percent by weight
Coagulating agent: Acetone/methanol=75/25 (percent by volume)

In the melt spinning of polyester or polyamide fibers, fibers having non-circular cross-sections are obtained from a nozzle with Y or X shaped cross-section. The cross-sectional shape of the fiber depends on the shape of the nozzle opening. However, a nozzle of non-circular cross-section is very expensive compared to one with circular cross-section. In addition, it is impossible to make a nozzle opening of a very small cross-section as is possible in a nozzle of circular cross-section.

In fact, a nozzle with non-circular cross-section cannot be used for preparing PMG filament of low denier by the known processes, since the maximum stretching ability of PMG fiber is very small in comparison with those of other synthetic fibers.

Economic considerations require that the spinning solution be spun at as high velocity as possible without loss of textile properties. The coagulating agents used hitherto in the wet spinning of PMG fibers are acetone, methyl ethyl ketone, ethyl acetate, lower alcohols, ethers, petroleum ether and mixtures of these compounds, as disclosed in Japanese patent publication Nos. 5,926/1965, 27,369/1965 and 6,608/1966. Since each of these coagulants is a combustible solvent having a low flash point, the spinning process is very dangerous. Therefore, expensive equipment for preventing fire and explosion and careful safety supervision are necessary.

SUMMARY OF THE INVENTION

We have found that a spinning solution of PMG in non-combustible methylene chloride, chloroform, 1,2-dichloroethane, 1,1,2-trichloroethane or tetrachloroethane can be coagulated by means of non-combustible carbon tetrachloride, 1,1,1-trichloroethane and ethylene tetrachloride, and that the PMG solution when wet-spun through a circular type nozzle into a coagulating bath of aliphatic hydrocarbons having a boiling point of 80° C. to 400° C. such as ligroin, kerosene and light oil, yields PMG fiber of a cross-section very different from the shape of the nozzle used. However, the PMG fiber obtained by using each of the two coagulating agents alone has unsatisfactory tensile properties such as tenacity and elongation.

It has been further found that carbon tetrachloride, 1,1,1-trichloroethane or ethylene tetrachloride may be added to the PMG solution in chlorinated hydrocarbons to such an extent as not to cause gelation of the PMG solution, and that the modified solution may be spun by extrusion into a coagulating bath containing a mixture of an aliphatic hydrocarbon having a boiling point of from 80° C. to 400° C., and carbon tetrachloride or 1,1,1-trichloroethane or ethylene tetrachloride. The PMG fiber obtained has non-circular cross-section and superior physical properties, and the shape of the cross-section may be widely varied according to the concentration of aliphatic hydrocarbons in the coagulating bath.

Any aliphatic hydrocarbon may be used as one component of the coagulating bath in the present process, if it has a boiling point of 80° C. to 400° C. Representative examples of such aliphatic hydrocarbons are ligroin, kerosene and light oil, which are unexpensively and readily available by fractional distillation of petroleum.

The mixture of an aliphatic hydrocarbon with carbon tetrachloride or 1,1,1-trichloroethane or ethylene tetrachloride as the coagulating agent results in a PMG fiber of improved mechanical properties and of non-circular cross-section.

Table 1 shows the physical properties of the PMG fibers obtained by extruding a PMG solution in 1,2-dichloroethane into various coagulating agents. The cross-sections of the PMG fibers are shown in FIG. 2.

TABLE I

Figure 2A:
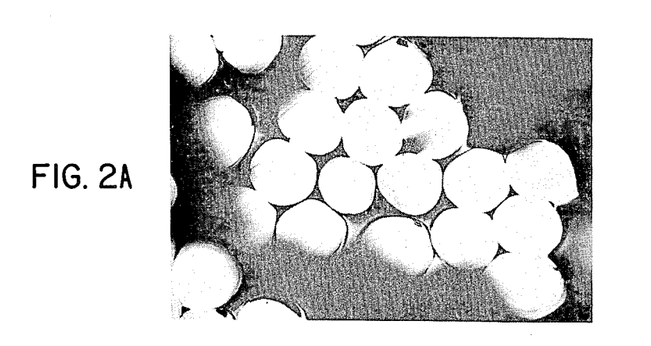
Figure 2B:
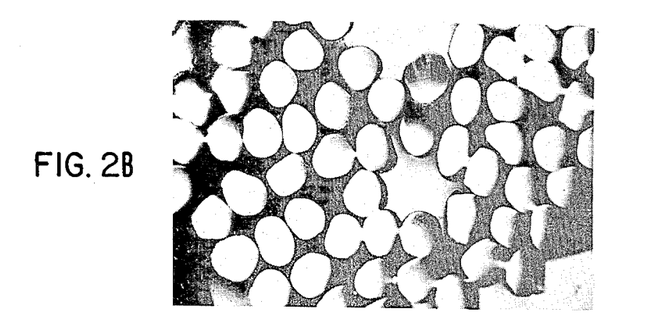
Figure 2C:
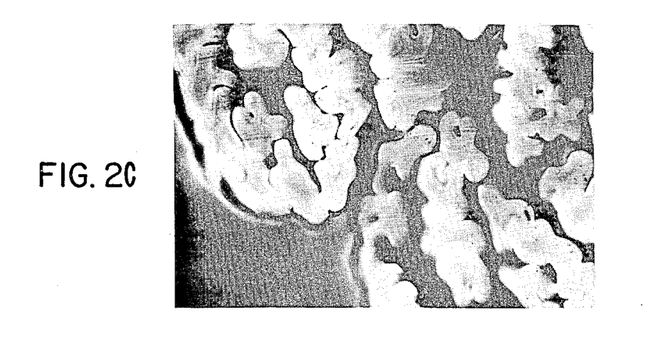
Figure 2D:
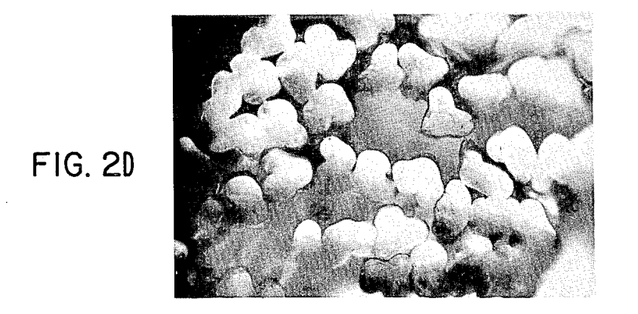
Figure 2E:
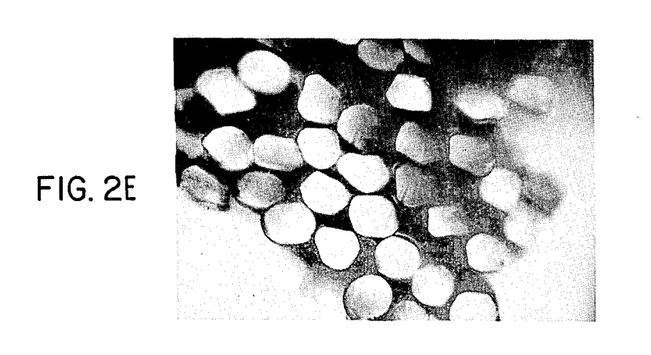
Figure 2F:
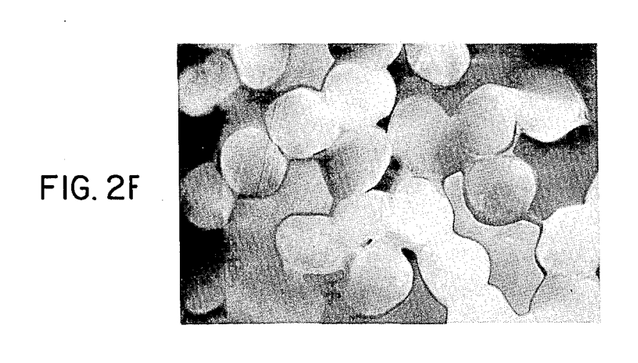
Figure 3A:
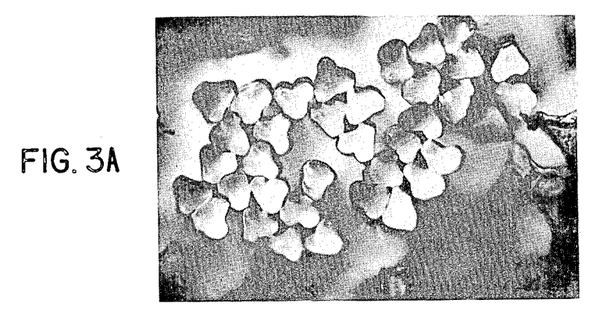
Figure 3B:
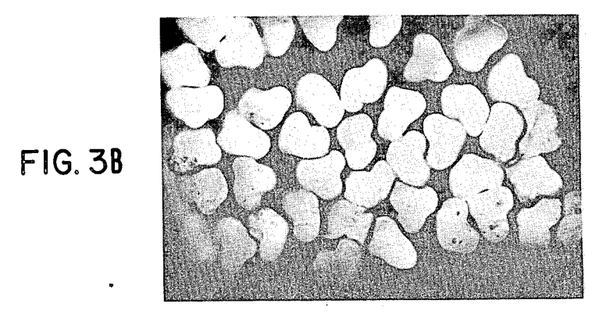
Figure 3C:
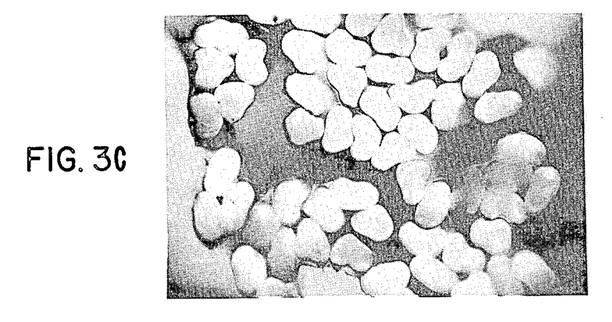
Figure 3D:
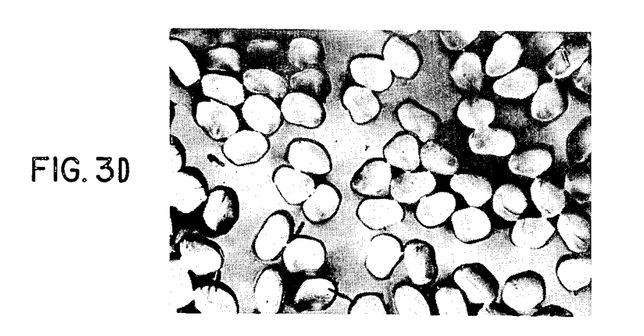
Figure 3E:
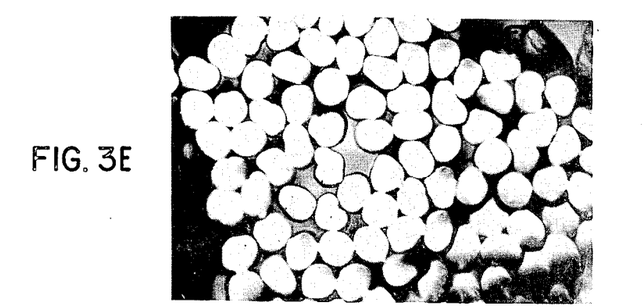
Figure 3F:
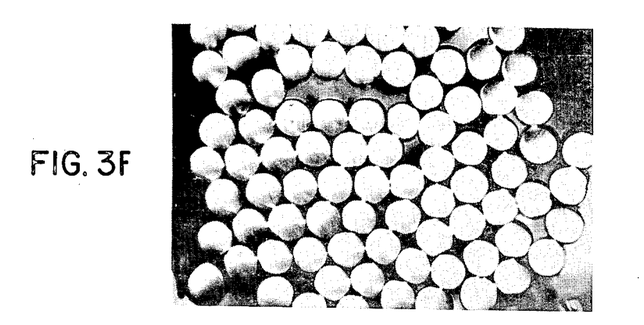
Figure 3G:
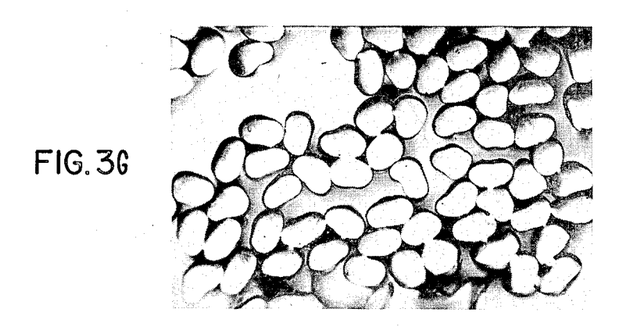

| Coagulating agent | Dry tenacity, gram/denier | Dry elongation, percent | Appearance | Cross-section |
|---|---|---|---|---|
| Carbon tetrachloride | 2.9 | 19.5 | Transparent | Figure 2(a). |
| Ethylene tetrachloride | 2.8 | 20.0 | do | Figure 2(b). |
| Kerosene | 2.3 | 17.5 | Turbid | Figure 2(c). |
| Kerosene/carbon tetrachloride=1/1 | 2.8 | 19.7 | Transparent | Figure 2(d). |
| Light oil/ethylene tetrachloride=1/2 | 2.9 | 20.2 | do | Figure 2(e). |
| Ligroin/ethylene tetrachloride=1/2 | 3.0 | 19.8 | do | Figure 2(f). |

NOTE:
Spinning solvent: 1,2-dichloroethane.
Intrinsic viscosity [$\eta$]: 2,6 (in dichloroacetic acid at 30° C.).
Polymer concentration: 13 percent by weight.
Spinning velocity: 50 meters/minute.
Pull-off Ratio: 1.0 (hereinafter referred to as P.O.R.).

The maximum spinnable P.O.R. can be greatly increased by mixing the PMG solution with carbon tetrachloride or 1,1,1-trichloroethane or ethylene tetrachloride which itself is a coagulating agent.

The relationship between coagulating agent content in the spinning solution and maximum spinnable P.O.R. is shown in Table 2.

TABLE 2

[Solvent in PMG solution: 1,1,2-trichloroethane [1]]

| | Carbon tetrachloride content, percent by weight | | | | | | | |
|---|---|---|---|---|---|---|---|---|
| | 0 | 5 | 10 | 20 | 30 | 40 | 50 | 60 |
| Percentage corresponding to the maximum content | 0 | 7.6 | 15.1 | 30.2 | 45.3 | 60.4 | 75.5 | 90.6 |
| Maximum spinnable P.O.R. | 1.6 | 1.8 | 2.1 | 2.6 | 3.0 | 3.2 | 3.8 | 3.9 |

[Solvent in PMG solution: methylene chloride [2]]

| | 1,1,1-trichloroethane content, percent | | | | | | | |
|---|---|---|---|---|---|---|---|---|
| | 0 | 5 | 10 | 20 | 30 | 40 | 50 | 55 |
| Percentage corresponding to the maximum content | 0 | 8.3 | 16.6 | 33.2 | 49.8 | 66.4 | 83.0 | 91.2 |
| Maximum spinnable P.O.R. | 1.2 | 1.5 | 1.9 | 2.4 | 2.8 | 3.0 | 3.1 | 3.6 |

[Solvent in PMG solution: 1,2-dichloroethane [3]]

| | Ethylene tetrachloride content, percent | | | | | | | |
|---|---|---|---|---|---|---|---|---|
| | 0 | 5 | 10 | 15 | 20 | 25 | 30 | 35 |
| Percentage corresponding to the maximum content | 0 | 13.3 | 26.6 | 33.9 | 53.2 | 66.5 | 67.8 | 93.2 |
| Maximum spinnable P.O.R. | 2.5 | 2.8 | 3.3 | 3.6 | 4.0 | 4.2 | 4.4 | 4.5 |

[1] Polymer concentration: 10 percent by weight; Intrinsic viscosity [$\eta$]: 2.3 (in dichloroacetic acid at 30° C.; Coagulating bath: kerosene/carbon tetrachloride=60/40 (by volume); Spinning velocity: 80 meters/minute.
[2] Polymer concentration: 9.5 percent by weight; Intrinsic viscosity [-]: 2.7 (in dichloroacetic acid at 30° C.; Coagulating bath: light oil/ethylene tetrachloride=40/60 (by volume percent); Spinning velocity: 80 meters/minute.

The content of carbon tetrachloride, 1,1,1-trichloroethane or ethylene tetrachloride coagulating agent in the spinning solution is preferably 50–90 percent by weight based on its maximum permissible content, for easy spinning and stability of the spinning solution.

The known coagulating agents such as methanol and acetone are hardly miscible with the PMG solution while carbon tetrachloride, 1,1,1-trichloroethane or ethylene tetrachloride can be mixed with the PMG solution to yield a homogeneous and stable solution suitable for spinning. According to the present invention, a concentrated spinning solution may be prepared by mixing carbon tetrachloride, 1,1,1-trichloroethane or ethylene tetrachloride with a concentrated PMG solution in chlorinated hydrocarbons.

The amount of carbon tetrachloride, 1,1,1-trichloroethane or ethylene tetrachloride necessary to maintain a homogeneous solution in admixture with the PMG solution may be varied according to the degree of polymerization of the PMG, the polymer concentration and the temperature. Table 3 shows the maximum concentrations of the coagulating agents in the PMG solution.

| Solvent in PMG solution | Amount[1] of carbon tetrachloride | Amount[1] of 1,1,1-trichloroethane | Amount[1] of ethylene tetrachloride |
| --- | --- | --- | --- |
| Methylene chloride | 90.0 | 83.5 | 60.3 |
| Chloroform | 84.5 | 78.3 | 52.7 |
| 1,2-dichloroethane | 60.4 | 56.3 | 39.5 |
| 1,1,2-trichloroethane | 72.6 | 65.1 | 45.2 |

[1] amount necessary to bring about gelation of 13.5 percent by weight PMG solution having an intrinsic viscosity ($\eta$) of 2.3–2.7 (in dichloroacetic acid at 30° C.) at 25° C. (coagulating agent amount in the total amount of solvents is represented in percent by weight.

According to the present invention, a P.O.R. value above 3.0 may be obtained, this value being much higher than 2.0–2.8, the highest P.O.R. values obtained hitherto (see Japanese patent publication No. 288/1966) and therefore the present process is especially advantageous for the production of PMG fiber of low denier. The high P.O.R. value may be maintained even at an extrusion speed of 80 meters/minute and spinning at more than 300 meters/minute is readily possible in the present process. At a P.O.R. value of 2.0 to 2.8 the extrusion speed of the known process was limited to about 30 meters/minute.

Although spun at very high P.O.R., the PMG fiber of the invention has desirable textile properties as is apparent from Table 4 and PMG fibers having non-circular cross-section can be obtained from a circular nozzle even at high spinning velocity and high P.O.R. (see FIG. 3).

According to the present invention, PMG fibers having various cross-sections can be obtained by varying the composition of the spinning solution and the coagulating bath when extruded from a circular nozzle.

Non-circular nozzles may also be used in the present invention. In this case the cross-section of the PMG fibers is modified by the nozzle used.

Figure 4A:
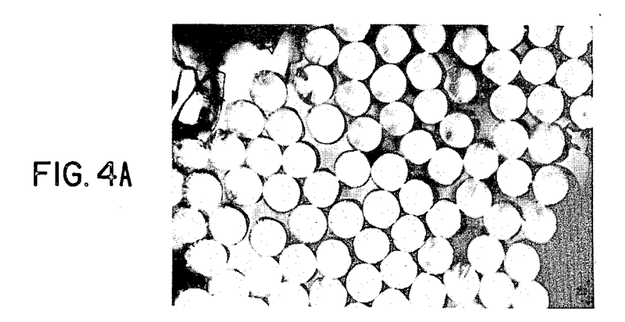
Figure 4B:
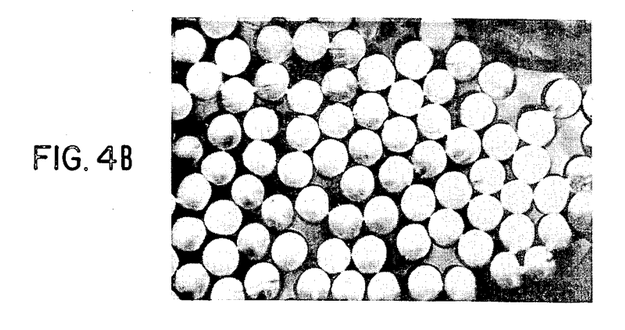

The modified cross-section is due to the presence of aliphatic hydrocarbons having a boiling point of from 80° C. to 400° C. and is not caused by other solvents having strong coagulating ability such as methanol, acetone and toluene. FIG. 4 shows photographs of PMG fiber obtained with methanol or acetone-ethylene tetrachloride mixture described in Table 5 as the coagulating agent.

TABLE 5

Coagulating agent:    Composition (percent by volume)
 (a) methanol.
 (b) acetone-ethylene tetrachloride ___________ 1:1

NOTE:

Spinning solvent: 1.2-dichloroethane/ethylene.
Tetrachloride=60/40 (percent by volume).
Polymer concentration: 10 percent by weight.
Intrinsic viscosity [$\eta$]=2.6 (in dichloroacetic acid at 30° C.).

The relationship between the composition of the coagulating bath and the textile properties of the PMG fiber is shown in Table 6. It will be understood from the data in Table 6 that the maximum allowable concentration of the PMG solvent in the coagulating bath is as high as 25% based on the total amount of coagulating agent. On the contrary, in the known process described in Japanese patent publication No. 27,369/1965, the maximum allowable concentration of the PMG solvent in the coagulating bath is 15%. Thus, the consumption of coagulating agent per unit of fiber produced may be greatly decreased compared with the known processes.

TABLE 4

| Composition of coagulating bath[1] | Maximum P.O.R. | P.O.R. 1.1 Tenacity, g./denier | P.O.R. 1.1 Elongation, percent | P.O.R. 1.5 Tenacity, g./denier | P.O.R. 1.5 Elongation, percent | P.O.R. 2.0 Tenacity, g./denier | P.O.R. 2.0 Elongation, percent | P.O.R. 3.0 Tenacity, g./denier | P.O.R. 3.0 Elongation, percent | P.O.R. 4.0 Tenacity, g./denier | P.O.R. 4.0 Elongation, percent |
| --- | --- | --- | --- | --- | --- | --- | --- | --- | --- | --- | --- |
| 100/0 | 4.8 | 2.5 | 21.2 | 2.7 | 22.4 | *a2.5 | 22.3 | 2.7 | 20.2 | 2.6 | 21.0 |
| 80/20 | 4.8 | 2.5 | 19.8 | 2.7 | 22.1 | *b2.6 | 20.4 | 2.8 | 19.7 | 2.7 | 20.3 |
| 60/40 | 4.6 | 2.9 | 25.2 | 2.8 | 18.4 | *c2.8 | 25.0 | 2.9 | 22.1 | *e2.8 | 24.1 |
| 40/60 | 4.6 | 3.0 | 23.7 | 2.6 | 25.5 | *d3.1 | 21.3 | 3.0 | 25.2 | 2.9 | 24.5 |
| 20/80 | 4.0 | 3.0 | 19.0 | 2.6 | 20.7 | *e2.9 | 20.6 | 3.1 | 19.3 | 2.9 | 19.9 |
| 0/100 | 2.3 | 2.6 | 23.0 | 2.8 | 21.5 | *f2.7 | 21.5 | | | | |

[1] Percent by volume (ligroin/ethylene tetrachloride).
*a-g: Cross-sections are shown in Fig. 3.

NOTE: spinning solvent: 1,2-dichloroethane/ethylene tetrachloride=65/35 polymer concentration: 10 percent by weight intrinsic viscosity [$\eta$]=2.6 (in dichloroacetic acid at 30°C) spinning velocity: 50 meters/minute nozzle: circular type 0.08 mm/20H.

As is apparent from FIG. 3, the deviation from circular cross section increases as the content of ethylene tetrachloride in the coagulating bath decreases. A change in the cross-section occurs when the coagulating bath contains a very small amount of aliphatic hydrocarbons having a boiling point of from 80° C. to 400° C. However, for the preparation of PMG fiber having usual textile properties, the content of said aliphatic hydrocarbons in the coagulating bath is preferably 10–90 percent by weight.

TABLE 6

| Composition of coagulating bath[1] | Maximum P.O.R. | P.O.R. 1.1 Tenacity, g./denier | P.O.R. 1.1 Elongation, percent | P.O.R. 1.5 Tenacity, g./denier | P.O.R. 1.5 Elongation, percent | P.O.R. 2.0 Tenacity, g./denier | P.O.R. 2.0 Elongation, percent | P.O.R. 3.0 Tenacity, g./denier | P.O.R. 3.0 Elongation, percent | P.O.R. 4.0 Tenacity, g./denier | P.O.R. 4.0 Elongation, percent |
| --- | --- | --- | --- | --- | --- | --- | --- | --- | --- | --- | --- |
| 35/65 | 2.6 | 2.8 | 24.0 | 2.9 | 25.2 | *a2.7 | 26.1 | | | | |
| 30/70 | 3.1 | 2.8 | 26.3 | 3.0 | 25.0 | 2.9 | 25.3 | 3.0 | 24.1 | | |
| 25/80 | 3.8 | 2.9 | 23.0 | 3.1 | 22.4 | *b3.1 | 21.2 | 2.8 | 25.7 | | |
| 20/85 | 4.1 | 3.1 | 26.5 | 3.0 | 24.1 | 2.9 | 25.4 | 2.9 | 26.0 | 2.7 | 25.1 |
| 10/95 | 4.3 | 3.0 | 22.5 | 3.0 | 22.9 | *c3.1 | 19.6 | 3.1 | 21.8 | 3.1 | 18.7 |
| 0/100 | 4.6 | 2.9 | 25.2 | 2.8 | 18.4 | 2.8 | 25.0 | 2.9 | 22.1 | 2.8 | 24.1 |

Figure 5A:
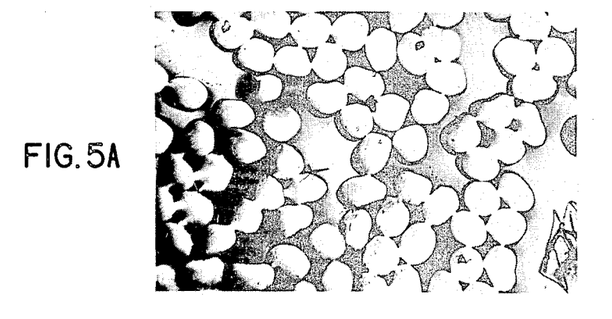
Figure 5B:
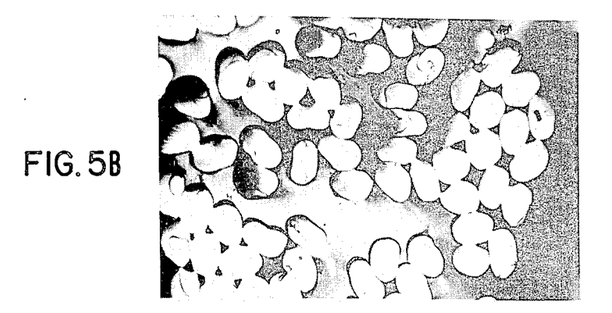
Figure 5C:
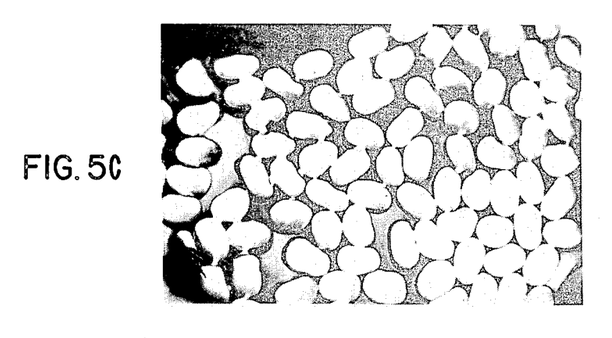
Figure 6A:
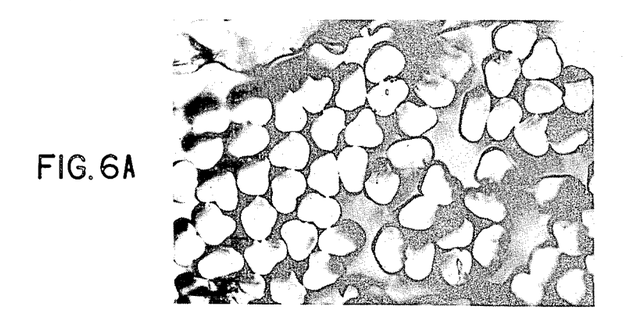
Figure 6B:
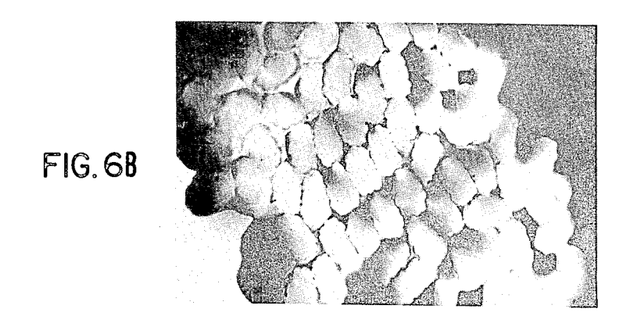
Figure 6C:
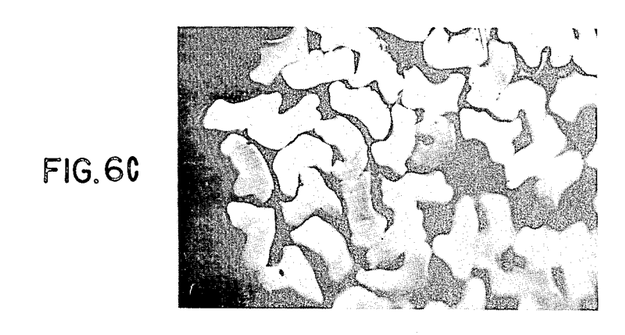
Figure 6D:
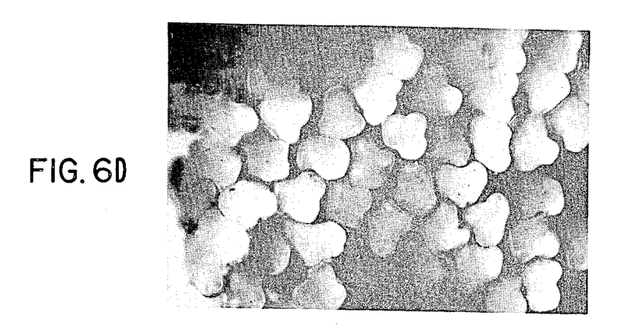
Figure 6E:
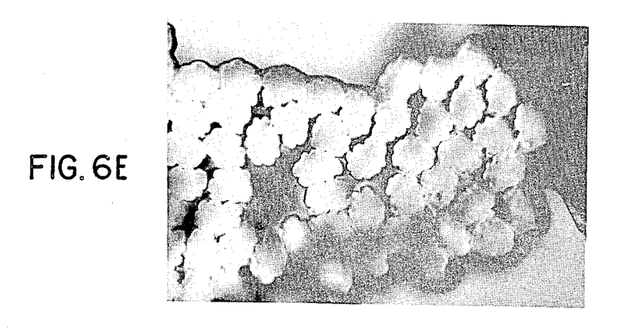
Figure 6F:
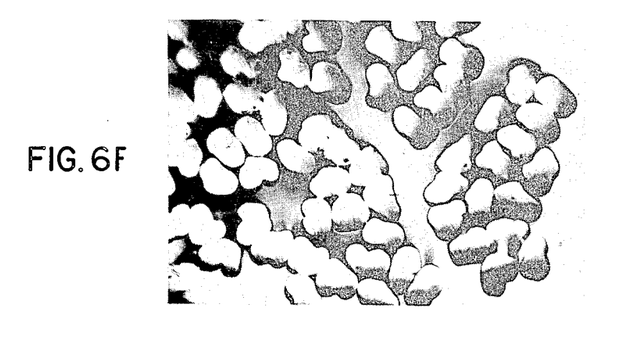
Figure 6G:
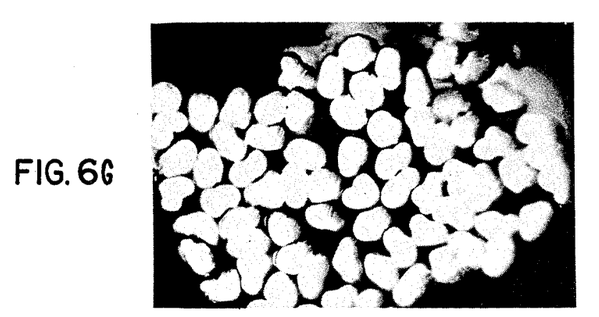
Figure 6H:
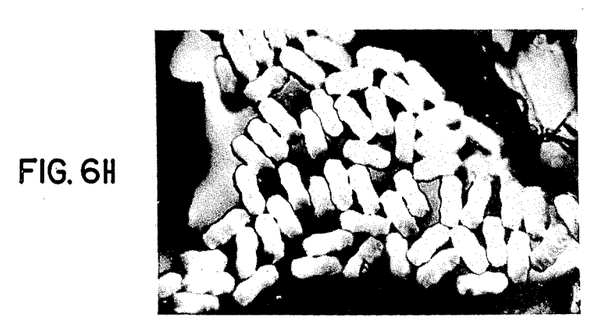
Figure 6I:
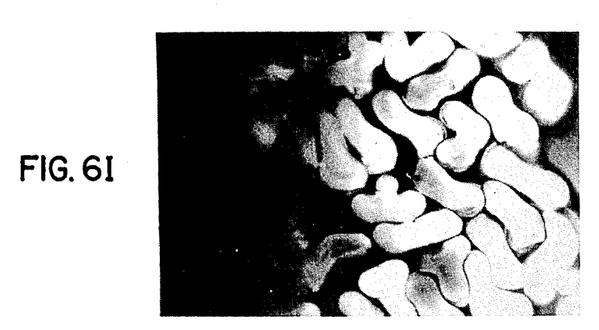

[1] 1,2-dichloroethane/ethylene tetrachloride plus ligroin.
*a-c: Cross-section shown in Fig. 5.

NOTE:
Spinning solvent: 1,2-dichloroethane/ethylene tetrachloride=65/35.
Polymer concentration: 10 percent by weight.
Intrinsic viscosity [$\eta$]=2.6 (in dichloroacetic acid at 30° C.).
Spinning velocity: 50 meters/minute.
Nozzle: circular type 0.08 mm./20H.
Initial concentration of coagulating bath: ethylene tetrachloride/ligroin=40 60.

The industrial advantages of the present invention lie in that (1) PMG fiber having non-circular cross-section can be wet-spun by means of a circular nozzle, (2) spinning is possible at a high P.O.R. that could not be hitherto achieved and, the maximum spinnable P.O.R. value is very high and PMG fiber of low denier may be efficiently obtained, (3) the coagulating agent of the present process is not readily combustible which greatly increases the safety of the spinning process and (4) the amount of coagulating agent consumed per unit of fiber produced is decreased compared with the known processes.

75 percent in air. It had a silk-like appearance with elegant high lustre. Its tensile properties were as follows:

Tenacity—3.2 grams/denier
Elongation—19.9 percent

Similar spinning operations were repeated using various kinds of PMG solution, additives and coagulating agents. The results obtained are summarized in Tables 7 and 7a and the fibers obtained in each case are shown in cross section in FIG. 6.

TABLE 7

| | PMG solution | | | Spinning solution | |
| --- | --- | --- | --- | --- | --- |
| Run No. | Solvent | Polymer concentration, percent by weight | Intrinsic viscosity $[\eta]$[1] | Additive, content | Polymer concentration |
| 1 | 1,2-dichloroethane | 24.0 | 2.6 | Ethylene tetrachloride, 35 | 10 |
| 2 | Chloroform | 21.1 | 2.5 | do | 13 |
| 3 | Methylene chloride | 23.1 | 2.7 | Ethylene tetrachloride, 60 | 10 |
| 4 | 1,1,2-trichloroethane | 21.6 | 2.3 | Carbon tetrachloride, 50 | 10 |
| 5 | Tetrachloroethane | 19.9 | 2.4 | Ethylene tetrachloride, 35 | 13 |
| 6 | 1,1,2-trichloroethane | 21.6 | 2.3 | {1,2-dichloroethane, 30<br>{Ethylene tetrachloride, 30 | 10 |
| 7 | 1,2-dichloroethane | 24.0 | 2.6 | Ethylene tetrachloride, 30 | 13 |
| 8 | do | 24.0 | 2.6 | 1,1,1-trichloroethane, 40 | 10 |
| 9 | Methylene chloride | 23.1 | 2.7 | 1,1,1-trichloroethane, 60 | 10 |

[1] Intrinsic viscosity was measured in dichloroacetic acid solution at 30° C.

TABLE 7a

| | Spinning condition | | Results | | |
| --- | --- | --- | --- | --- | --- |
| Run No. | Coagulating agent, content | Shape of nozzle, draft | Cross-section photograph | Tenacity, g./denier | Elongation, percent |
| 1 | {Kerosene, 50<br>{Ethylene tetrachloride, 50 | Circular cross-section, 3.0 | a | 3.2 | 19.9 |
| 2 | {Kerosene, 50<br>{Ethylene tetrachloride, 50 | Circular cross-section, 3.5 | b | 3.1 | 20.3 |
| 3 | {Light oil, 50<br>{Ethylene tetrachloride, 50 | ∞ shaped cross-section, 3.0 | c | 3.0 | 22.1 |
| 4 | {Kerosene, 40<br>{Carbon tetrachloride, 60 | Circular cross-section, 2.8 | d | 2.8 | 23.0 |
| 5 | {Kerosene, 20<br>{Ethylene tetrachloride, 80 | Circular cross-section, 3.0 | e | 3.3 | 21.5 |
| 6 | {Light oil, 80<br>{Ethylene tetrachloride, 20 | Circular cross-section, 4.0 | f | 3.1 | 18.7 |
| 7 | {Ligroin, 80<br>{Carbon tetrachloride, 20 | do | g | 3.3 | 20.9 |
| 8 | {Kerosene, 60<br>{1,1,1-trichloroethane, 40 | Circular cross-section, 3.3 | h | 3.0 | 22.9 |
| 9 | {Ligroin, 50<br>{1,1,1-trichloroethane, 50 | > shaped cross-section, 3.0 | i | 2.9 | 24.1 |

The following further illustrates the present invention.

EXAMPLE

To a 24.6 percent solution of PMG in 1,2-dichloroethane, which has an intrinsic viscosity $[\eta]$ of 2.6, ethylene tetrachloride and 1,2-dichloroethane were added dropwise with stirring at 40° C. to prepare a spinning solution which contained 35 percent by weight of ethylene tetrachloride and 10 percent by weight of PMG. The solution was extruded from a nozzle having 20 circular holes of 0.08 mm. diameter into a coagulating bath containing 50 percent by volume of kerosene and 50 percent by volume of ethylene tetrachloride at a velocity of 50 meters/minute. The fiber obtained at a spinning velocity of 150 meters/minute at a P.O.R. of 3.0 was stretched

What we claim is:
1. A process for preparing poly-γ-methyl glutamate fiber of non-circular cross section which comprises:
   (a) preparing a spinning solution essentially consisting of poly-γ-methyl glutamate and chlorinated hydrocarbon including a solvent selected from the group consisting of methylene chloride, chloroform, 1,2-dichloroethane, 1,1,2-trichloroethane, tetrachloroethane, and mixtures thereof; and
   (b) extruding said solution into a coagulating bath consisting essentially of 10 to 90 percent by weight of an aliphatic hydrocarbon having a boiling point of 80° to 400° C. and a coagulating agent selected from the group consisting of carbon tetrachloride, 1,1,1-trichloroethane, and ethylene tetrachloride,

(1) the concentration of said poly-γ-methyl glutamate in said solvent being sufficient to cause the formation of fibers in said coagulating bath.

2. A process as set forth in claim 1, wherein a compound selected from said group of coagulating agents is added to said solution prior to said extruding in an amount sufficient to permit spinning of said fibers at an increased pull-off ratio, but smaller than the amount of said compound which would cause gelling of said solution.

3. A process as set forth in claim 1, wherein the amount of said compound in said spinning solution is between 50 and 90 percent of the amount causing said gelling.

4. A process as set forth in claim 1, wherein said solution is extruded from a substantially circular nozzle.

References Cited

UNITED STATES PATENTS

| | | | |
|---|---|---|---|
| 3,089,749 | 5/1963 | Ballard | 264—203 |
| 3,344,219 | 9/1967 | Wakasa et al. | 264—178ZL |
| 3,371,069 | 2/1968 | Miyamae et al | 264—134X |
| 3,387,070 | 6/1968 | Wakasa et al. | 264—210L |

JULIUS FROME, Primary Examiner

J. H. WOO, Assistant Examiner

U.S. Cl. X.R.

260—33.8, 78; 264—203